(12) United States Patent
Hasbun

(10) Patent No.: US 6,205,548 B1
(45) Date of Patent: Mar. 20, 2001

(54) METHODS AND APPARATUS FOR UPDATING A NONVOLATILE MEMORY

(75) Inventor: Robert N. Hasbun, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/127,426

(22) Filed: Jul. 31, 1998

(51) Int. Cl.$^7$ ................................................ G06F 9/06
(52) U.S. Cl. ......................... 713/2; 713/100; 711/170; 711/200
(58) Field of Search ................. 713/2, 100; 395/430; 455/419; 711/170, 200

(56) References Cited

U.S. PATENT DOCUMENTS

| | | | |
|---|---|---|---|
| 4,805,109 | * 2/1989 | Kroll et al. | 364/464.02 |
| 4,817,004 | * 3/1989 | Kroll et al. | 364/464.02 |
| 4,845,632 | * 7/1989 | Kroll et al. | 364/464.02 |
| 5,187,798 | * 2/1993 | Nambudiri et al. | 712/1 |
| 5,467,449 | * 11/1995 | Gauronski et al. | 714/57 |
| 5,479,639 | * 12/1995 | Ewertz et al. | 395/430 |
| 5,579,522 | * 11/1996 | Christeson et al. | 713/2 |
| 5,758,056 | * 5/1998 | Barr | 714/7 |
| 5,860,142 | * 6/1999 | Cepulis | 711/202 |
| 5,878,256 | * 3/1999 | Bealkowski et al. | 713/2 |
| 5,889,987 | * 3/1999 | Nelson et al. | 713/2 |
| 5,925,140 | * 7/1999 | Hudson | 714/52 |
| 5,930,504 | * 7/1999 | Gabel | 713/2 |
| 5,974,312 | * 10/1999 | Hayes, Jr. et al. | 455/419 |

* cited by examiner

Primary Examiner—Thomas C. Lee
Assistant Examiner—Nguyễn Xuân Nguyên
(74) Attorney, Agent, or Firm—Blakely, Sokoloff, Taylor & Zafman LLP

(57) ABSTRACT

Code is written to a selected portion of a nonvolatile memory having a first portion associated with a first range of addresses and a second portion associated with a second range of addresses, wherein the selected portion is the second portion. Toggling a block selector swaps addresses of the first and second portions, wherein the first range of addresses reference the second portion of nonvolatile memory and the second range of addresses reference the first portion of nonvolatile memory. An apparatus includes a processor that initiates a boot sequence at a pre-determined address. An address decoder accesses a one of a first and a second block of nonvolatile memory in response to the pre-determined address in accordance with a value of the block selector. A method using a group selector includes the step of receiving an address from a processor. The address is decoded to access one of a first and a second group of blocks of nonvolatile memory in accordance with a value of the group selector. An apparatus includes an address decoder coupled to the group selector and a nonvolatile memory having a plurality of blocks. The address decoder associates a first range of addresses with a first group and a second range of addresses with the second group if the group selector has a first value. The address decoder associates the first range of with the second group and the second range with the first group if the group selector has a second value.

23 Claims, 8 Drawing Sheets

| BLOCK SELECTOR | DESCRIPTION | ACTION |
|---|---|---|
| 1 | BLOCK 1 LOCKED BLOCK 2 UNLOCKED | BOOT FROM BLOCK 1 PERMIT UPDATE OF BLOCK 2 |
| 0 | BLOCK 1 UNLOCKED BLOCK 2 LOCKED | BOOT FROM BLOCK 2 PERMIT UPDATE OF BLOCK 1 |

Figure 6

METHODS AND APPARATUS FOR UPDATING A NONVOLATILE MEMORY

FIELD OF THE INVENTION

This invention relates to the field of computer systems. In particular, this invention is drawn to method and apparatus for updating a nonvolatile memory.

BACKGROUND OF THE INVENTION

Initialization of a computer system ("booting") is performed upon power-up of the computer system or hardware or software reset operations. In one boot scheme the processor is designed to read a pre-determined memory location when the processor is reset or powered up. The pre-determined memory location stores a pointer or an address which directs the processor to a memory address of the beginning of the bootstrap routines. The pointer or address is referred to as a boot vector.

The boot vector defaults to an address in a nonvolatile memory such as read-only memory (ROM). For software resets, however, the boot vector may point to a random access memory (RAM) location. The nonvolatile memory stores the bootstrap loader and typically stores other initialization routines such as the power on system test (POST). The device storing the bootstrap loader and other minimal initialization procedures is referred to as the boot device.

The nonvolatile memory may also include routines for communicating with input/output devices in the computer system. In some computer systems these routines are collectively referred to as the Basic Input Output System (BIOS). The BIOS provides a common interface so that software executing on the processor can communicate with input/output devices such as the keyboard, mouse, nonvolatile mass memory storage device, and other peripheral devices.

ROM based storage techniques for the boot code and BIOS tend to be inflexible with respect to modification. The BIOS provided with the system may have errors or be limited to handling certain kinds or types of peripheral devices. In order to modify the BIOS or boot code, the ROM containing the BIOS must be replaced. This may require partially disassembling the computer system to gain access to the ROM. The ROM may be difficult to replace if it is solder mounted.

ROMs, programmable read only memory (PROM), and electrically programmable read only memories (EPROMs) represent various types of nonvolatile semiconductor memories. Flash electrically erasable programmable read only memory ("flash memory") is a type of rewritable nonvolatile semiconductor memory.

The use of flash memory for storing the BIOS and boot code permits greater flexibility in handling updates. For example, the BIOS can be updated by running a program thus eliminating the need to replace ROMs.

No provision is typically available for updating the boot code itself, however. If the boot code must begin at a pre-determined address, then the updated boot code must start at the same location as the current version of the boot code. Thus an update operation would effectively overwrite the current version of the boot code with the updated boot code. If a power loss occurs before the updated boot code can be written, both the current version and the updated boot code may be rendered unusable. If the boot code is corrupted, the system cannot boot and is typically rendered inoperable.

A passive solution to this problem is simply to provide no ready means of updating the boot code. As long as no physical impediment prevents modification of the range of memory containing the boot code, however, the computer system is exposed to a risk of intentional or inadvertent modification of the boot code. Inadvertent or intentional modification may result in rendering the computer inoperable until the nonvolatile memory is replaced. Even if a skilled user is intentionally attempting to modify the boot code, there is no provision for using the previous version of the boot code in the event of an unsuccessful programming attempt. If a power failure occurred during an attempted update to the boot code then both the old and the new version of the boot code may be corrupted. Thus the computer may be rendered inoperable until the nonvolatile memory is physically replaced.

Another technique designed to prevent corruption of the boot code is to have some portion of the rewritable nonvolatile memory locked so that its contents cannot be erased or modified. The locked portion typically contains the boot code but not the BIOS. Thus BIOS update software is able to update the BIOS with either a completely unlocked or a partially locked nonvolatile memory, but the boot code is not readily modified with either solution. The locked portion may even store special update code that is automatically used whenever the BIOS is corrupted. The special update code requests the user to provide some storage medium having a copy of the BIOS so that the BIOS can be updated from the storage medium. The special update code, however, does not provide any mechanism for replacing the boot code.

SUMMARY OF THE INVENTION

A method of updating code includes the step of writing code to a selected portion of a nonvolatile memory having a first portion associated with a first range of addresses and a second portion associated with a second range of addresses, wherein the selected portion is the second portion. A block selector is toggled to swap addresses of the first and second portions, wherein the first range of addresses reference the second portion of nonvolatile memory and the second range of addresses reference the first portion of nonvolatile memory.

An apparatus using the block selector includes a processor that initiates a boot sequence at a pre-determined address. An address decoder accesses the first block in response to the pre-determined address when the block selector has a first value. The address decoder accesses the second block in response to the pre-determined address when the block selector has a second value.

Another method includes the step of receiving an address from a processor. The address is decoded in accordance with a first value of a group selector to access a first group of at least one block of nonvolatile memory associated with a first range of addresses, wherein a second group of at least one block of nonvolatile memory is associated with a second range of addresses. The group selector is toggled to a second value, wherein the first range is associated with the second group and the second range is associated with the first group.

An apparatus using the group selector includes a nonvolatile memory having a plurality of blocks and an address decoder. The address decoder associates a first range of addresses with a first group of at least one block of nonvolatile memory and a second range of addresses with a second group of at least one block of nonvolatile memory if the group selector has a first value. The address decoder associates the first range with the second group and the second range with the first group if the group selector has a second value.

Other features and advantages of the present invention will be apparent from the accompanying drawings and from the detailed description that follows below.

BRIEF DESCRIPTION OF THE DRAWINGS

The present invention is illustrated by way of example and not limitation in the FIGS. of the accompanying drawings, in which like references indicate similar elements and in which:

FIG. 6 illustrates a table of block selector values and descriptions.

DETAILED DESCRIPTION

Figure 1:
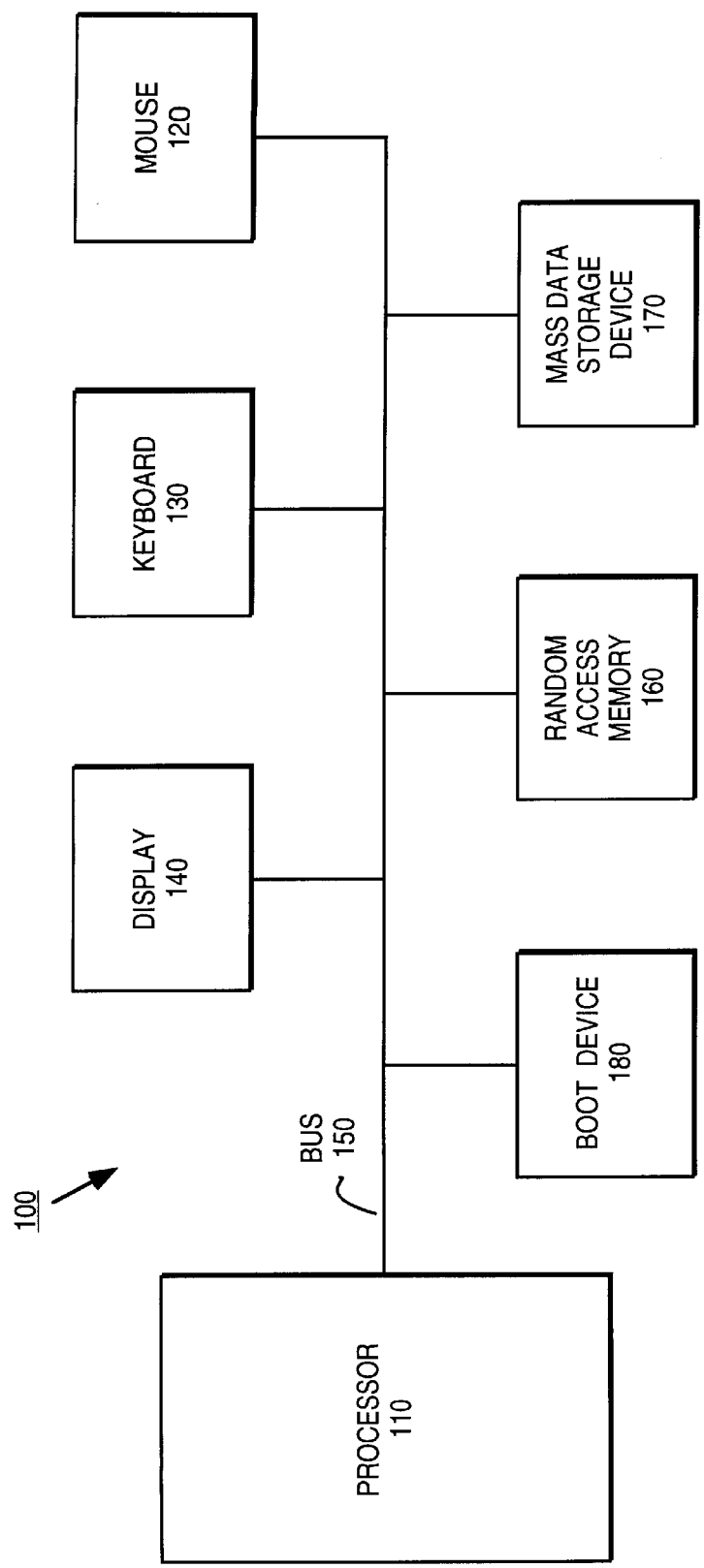
FIG. 1 illustrates a computer system block diagram.

FIG. 1 illustrates a computer system architecture. The computer system 100 includes processor 110. Input devices such as mouse 120 and keyboard 130 permit the user to input data to computer system 100. Information generated by the processor is provided to an output device such as display 140. Computer system 100 includes random access memory (RAM) 160 which is used by the processor. Nonvolatile mass data storage device 170 is used to retain programs and data even when the computer system is powered down. In one embodiment nonvolatile mass storage device 170 is an electromechanical hard drive. In another embodiment nonvolatile mass storage device 170 is a solid state disk drive. Mouse 120, keyboard 130, RAM 160, boot device 180, and nonvolatile mass storage device 170 are typically communicatively coupled to processor 110 through one or more address and data busses such as bus 150.

Initialization of the computer system is performed upon power-up of the computer system or hardware or software reset operations. In one embodiment, the processor is designed to read a pre-determined memory location when the processor is reset or powered up. The pre-determined memory location stores a pointer or an address which directs the processor to a memory address of the beginning of the bootstrap routines. The pointer or address is referred to as a boot vector. In one embodiment, the boot vector references boot device 180 by default.

In one embodiment, boot device 180 is nonvolatile memory such as flash electrically erasable programmable read only memory ("flash EEPROM" or "flash memory"). The use of flash memory for storing the boot code and the BIOS permits greater flexibility in handling system modification or BIOS updates. The nonvolatile memory can be updated by running a program thus eliminating the need to replace ROMs.

Flash memory cells cannot be rewritten with new data without first erasing them, with the exception that any flash memory cell in an erased stated can be programmed. Generally, flash memory cells are not individually erasable. Flash memories are typically subdivided into one or more individually erasable blocks. An entire block must be erased in order to erase any cell within the block. Erasure of a block of flash memory sets all the cells within the block to a pre-determined value. By convention, an erased flash cell is considered to be storing a value of "1". Flash EEPROM cells are typically single transistor memory cells and can thus be distinguished from two-transistor EEPROM cells which may also be block erasable.

Figure 2:
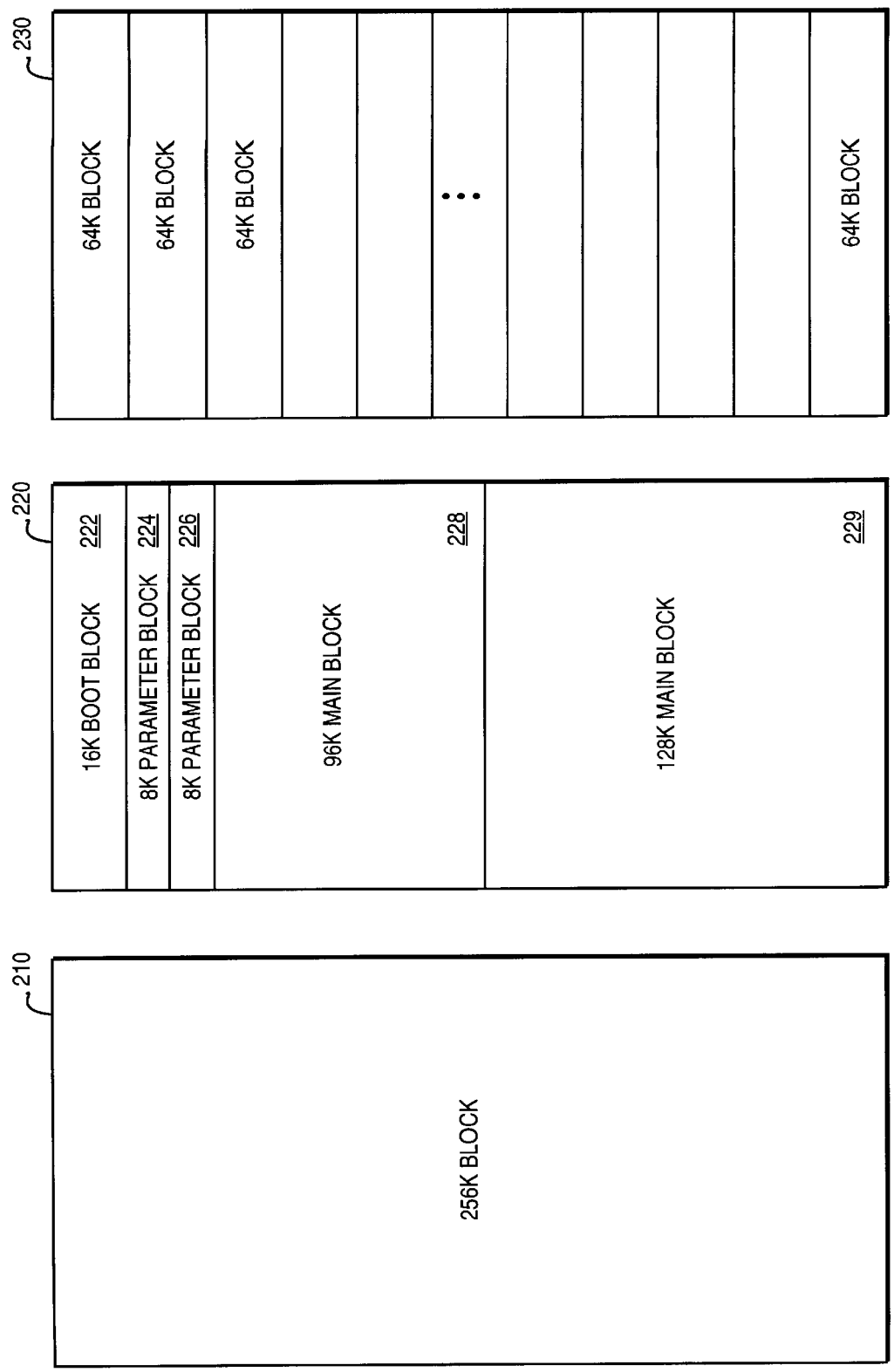
FIG. 2 illustrates bulk, asymmetrically, and symmetrically blocked nonvolatile memories.

FIG. 2 illustrates a single block architecture 210 and an asymmetrically blocked architecture 220 for storing the bootstrap routines, parameter data, and BIOS. The single or "bulk" block architecture 210 must be fully erased before being reprogrammed. Thus the bootstrap loader, the BIOS, and computer system specific parameter information are erased every time the BIOS or parameter information is modified.

The bootstrap loader, BIOS, and parameter data can be placed in separate blocks in order to permit independent modification. An asymmetrical blocking architecture is designed to accommodate storage of the bootstrap loader, BIOS, and parameter data in separate blocks in accordance with the relative sizes of the bootstrap loader, BIOS, and parameter data.

Asymmetrical blocked architecture 220 provides separate blocks for bootstrap routines, parameter data, and BIOS. The bootstrap routines are stored in boot block 222. Boot block 222 may also be referred to as startup block 222. Parameter data is stored in blocks 224 and 226. BIOS is stored in blocks 228 and 229. Thus the bootstrap routines, parameter data, and BIOS are treated as objects which can be independently modified by placing them in physically distinct blocks. The boot block may be a hardware-locked block to prevent its modification.

The update process for single and asymmetrically blocked architectures is typically not a reliable process. If a power failure occurs between initiation of the erase procedures and before a block has been completely reprogrammed, the computer system may not be able to properly reboot because the contents of the block may be missing or invalid.

With respect to the single block architecture, a power loss may be particularly catastrophic. Because the flash memory must first be erased before being reprogrammed, the bootstrap loader and other initialization routines may not be available upon power up.

The asymmetrically blocked architecture permits independently updating the BIOS or parameter data without erasing the startup block because the asymmetrical architecture is designed to accommodate storing BIOS, parameter data, and the boot code in separate blocks. The device is blocked so that objects such as bootstrap routines, parameter data, and BIOS can be placed in separately erasable blocks. The need to place all the objects within a nonvolatile memory of predetermined size requires limiting wasted memory within the boot device. These constraints result in a nonvolatile memory having different-sized blocks. The size and number of blocks may need to change as computer systems become more sophisticated. The block sizes of the asymmetrically blocked flash, however, are determined when the nonvolatile memory is fabricated. Thus the asymmetrically blocked architecture tends to be inflexible with respect to expansion or contraction of the startup block, parameter information, and BIOS.

For example, the parameter block is fixed in size and thus parameter data cannot exceed the block size determined at the time of fabrication. In addition, because the architecture is designed to store specific types of information in each block, any excess memory within a block is wasted. Excess space within the BIOS block cannot be used because the data stored there will be lost during a BIOS update. Thus the storage "granularity" of an asymmetrically blocked flash architecture varies and is limited to the size of the individual blocks.

An alternative to the bulk and asymmetrically blocked architectures is to use a flash memory manager (FMM) in conjunction with a symmetrically blocked architecture 230. The FMM "virtualizes" block boundaries so that each stored object is treated as if it resides in its own block. For applications external to the FMM, this permits handling the stored objects without regard to the physical blocks they reside in or span. Instead of placing functionally distinct routines and data in separate physical blocks to ensure independent modification, the FMM provides a means of managing objects independently of physical block boundaries. One example of a flash memory manager is described in application Ser. No. 08/834,930 of Hasbun, et al. entitled "Method of Performing Reliable Updates in a Symmetrically Blocked Nonvolatile Memory having a Bifurcated Storage Architecture" filed on Apr. 6, 1997.

Figure 3:
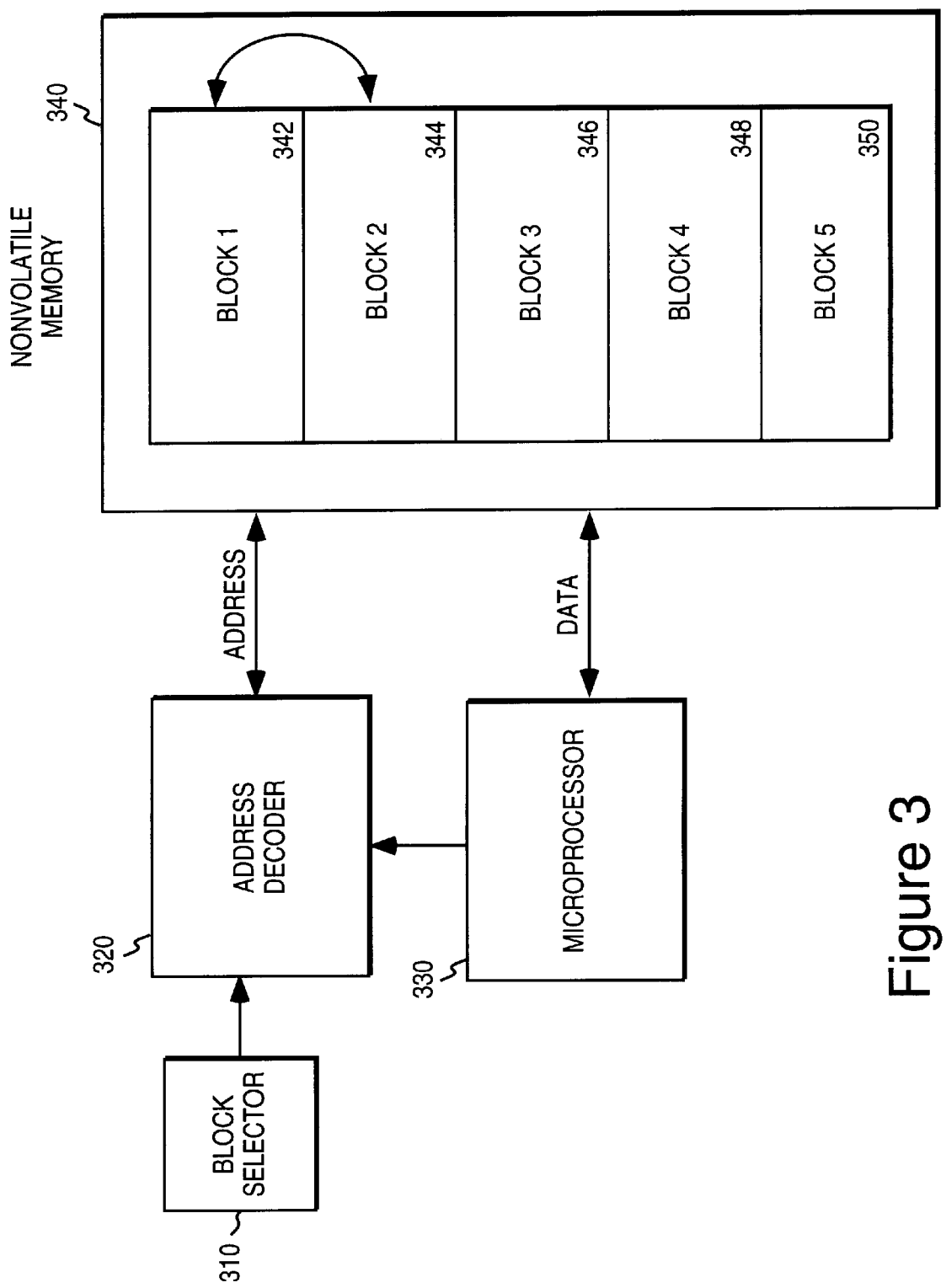
FIG. 3 illustrates one embodiment of apparatus to enable updating the boot code stored in one of the first and second portions of the nonvolatile memory.

FIG. 3 illustrates circuitry for updating information stored in a block even if the block itself is permanently locked. Nonvolatile memory 340 has a plurality of blocks 342–350. The locked block itself may not be modifiable, but the referenced contents may be updated by swapping addresses with another unlocked block of the same size. This may be particularly useful for updating the boot code stored in a physically locked block. The circuitry is applicable regardless of the blocking architecture (e.g., symmetrical or asymmetrical) of the nonvolatile memory. In one embodiment, nonvolatile memory 340 is symmetrically blocked. In an alternative embodiment, nonvolatile memory 340 is asymmetrically blocked.

Processor 330 requests information stored at a particular address in nonvolatile memory 340 by providing addresses to address decoder 320. Address decoder 320 then accesses the nonvolatile memory according to the mapping of the addresses to the nonvolatile memory.

Block selector 310 serves as a control input to address decoder 320. In one embodiment, block selector 310 is a single bit of a register. Depending upon the value of the block selector 310, the address decoder 330 selects either block 342 or block 344 as the active boot block. The nonvolatile memory 340 may be asymmetrically blocked as long as blocks 342 and 344 have the same addressable storage capacity (e.g., same size blocks).

In one embodiment, the block selector 310, address decoder 320, and nonvolatile memory 340 reside within the same nonvolatile memory device. In one embodiment, the block selector 310, address decoder 320, and nonvolatile memory 340 reside on a same integrated circuit die.

For one value of the block selector, the address decoder associates a first range of addresses with block 342 and a second range of addresses with block 344. For another value of the block selector, the address decoder associates the first range of addresses with block 344 and the second range of addresses with block 342. Thus the address decoder effectively swaps references to blocks 342 and 344 depending upon the value of the block selector. In one embodiment, the swapping or remapping technique only affects a subset of the plurality of blocks in the nonvolatile memory so that the address mapping to the other blocks remains unchanged. Thus for example, the block selector value has no effect on the mapping of addresses for blocks 346–350.

Figure 4:
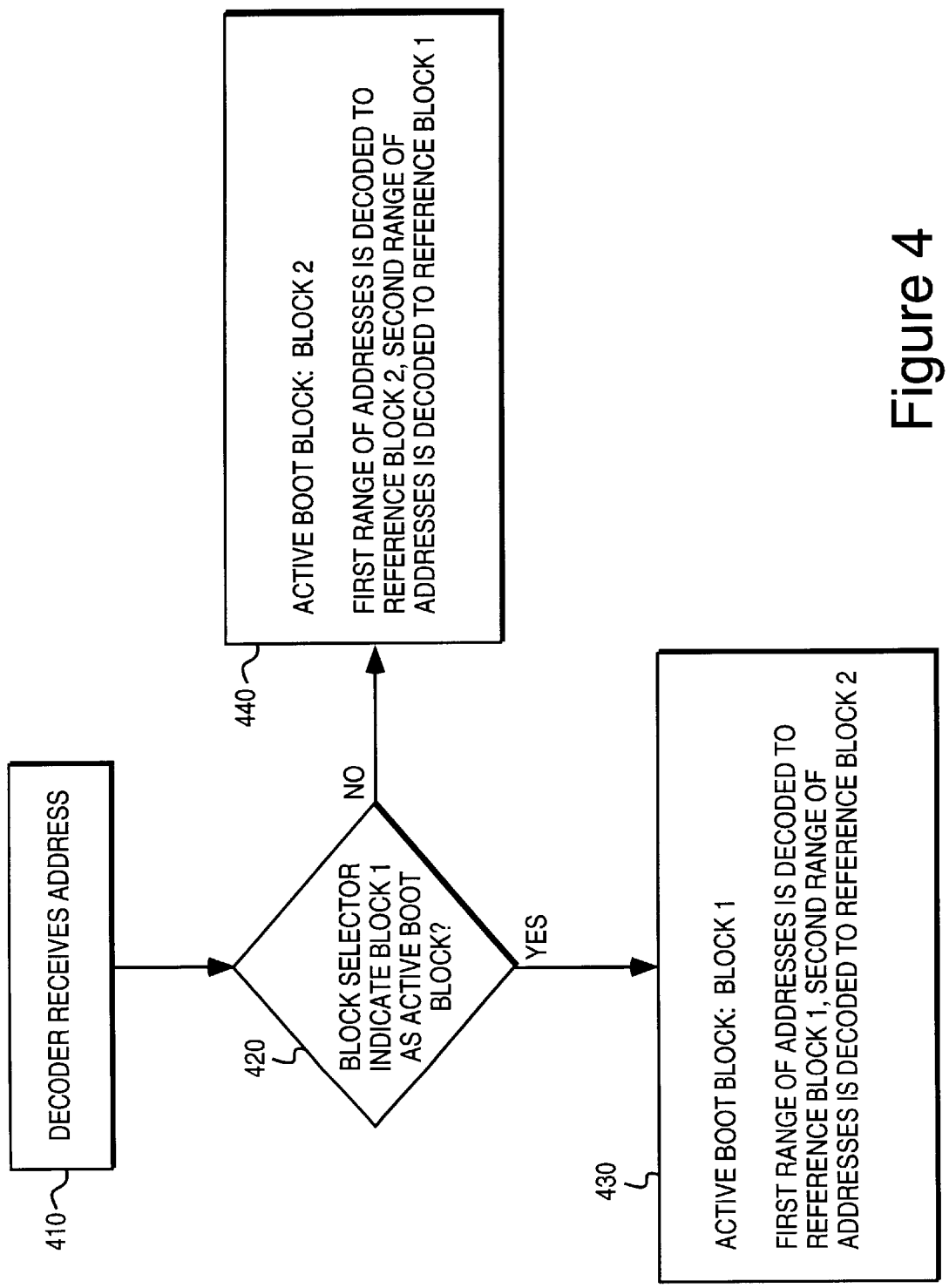
FIG. 4 illustrates a method of decoding addresses in accordance with a value of the block selector.

FIG. 4 illustrates operation of the address decoder during a boot sequence beginning with receiving an address (e.g., boot vector). Step 420 determines which block is the active boot block based on the value of the block selector.

If the block selector value indicates block 1 (342) is selected as the active boot block then processing continues with step 430. For a first range of addresses (associated with the boot process), the decoder translates the first range of addresses to access block 342. A second range of addresses will access block 344.

If, however, the block selector value indicates block 2 (344) is selected as the active boot block, then processing continues with step 440. The decoder translates the first range of addresses to access block 344 instead of block 342. Any address in the second range of addresses will be decoded to access block 342. Thus toggling the value of the block selector effectively remaps or swaps addresses for blocks 342 and 344.

If the blocks themselves are not physically locked, then the block selector can be toggled to permit updating and subsequently booting from either the first or second blocks. In one embodiment, the block selector is implemented in nonvolatile memory to ensure that the proper boot block selection is maintained for the next boot sequence. In one embodiment, the block selector 310 itself can be locked to prevent subsequent unintended selection of another block as the boot block.

Figure 5:
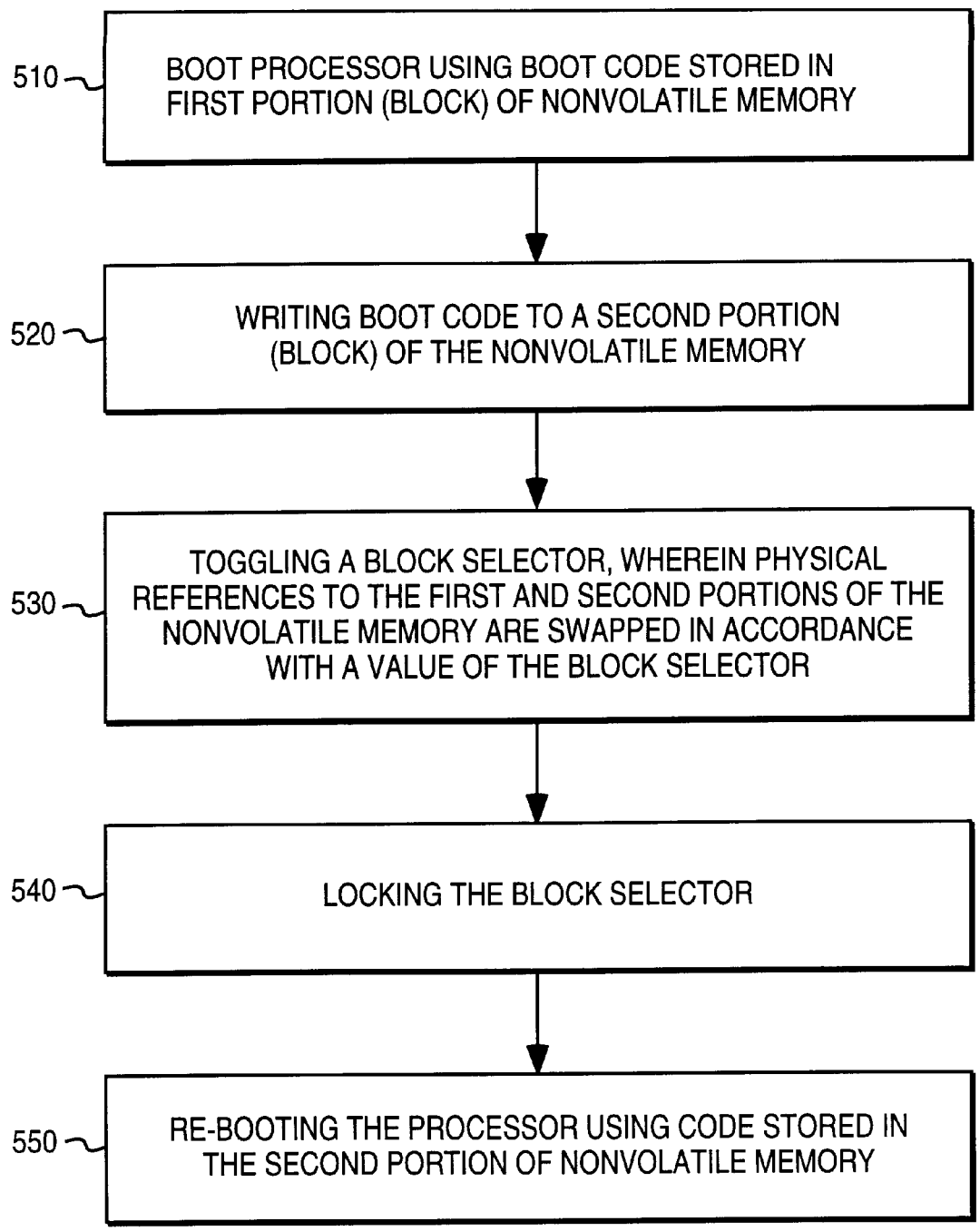
FIG. 5 illustrates a method of updating boot code stored in the nonvolatile memory.
Figure 7:
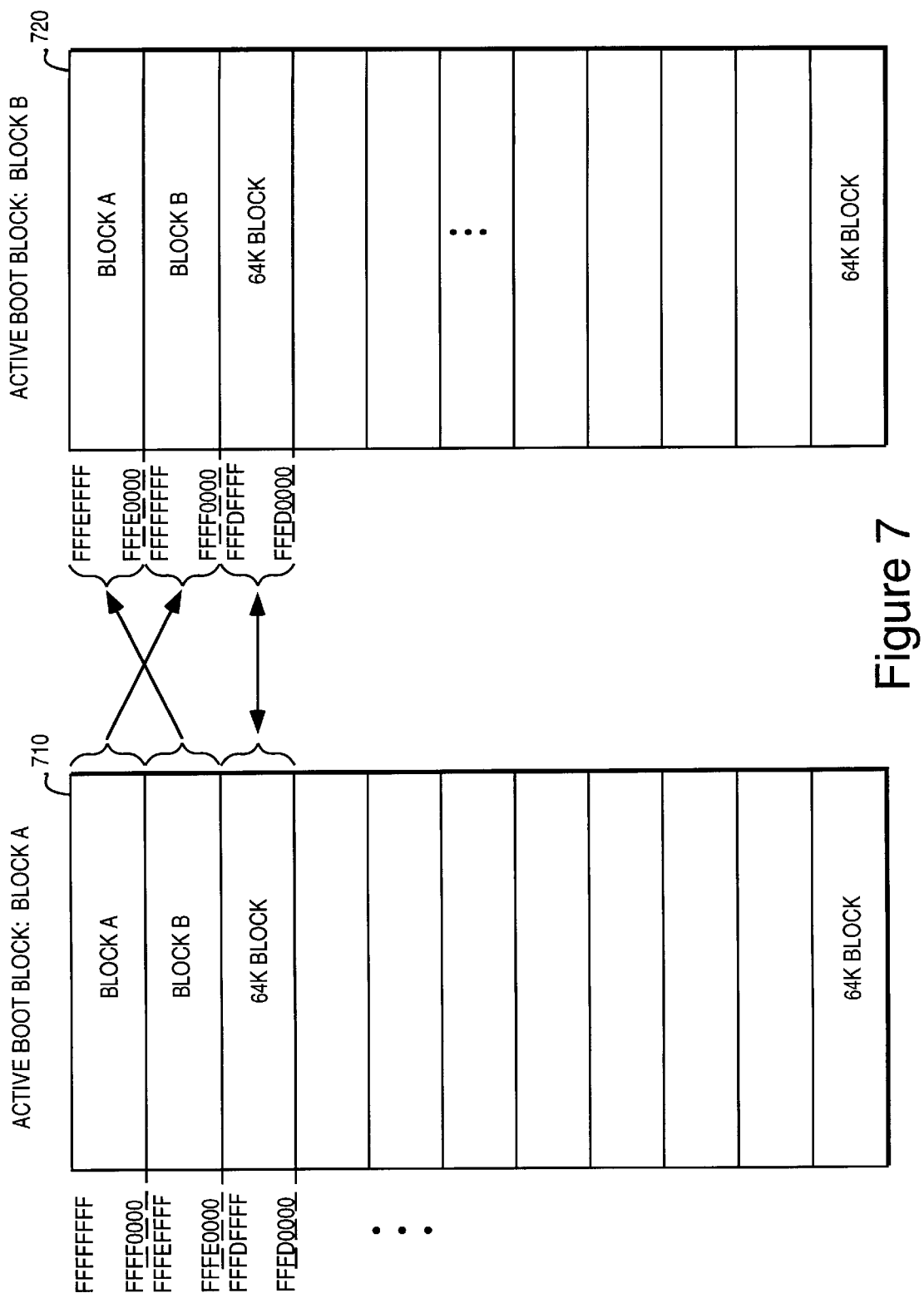
FIG. 7 illustrates the swapping of the nonvolatile memory addresses in accordance with the value of the block selector.

FIG. 5 illustrates a method of updating boot code using the block selector. The processor is booted with boot code stored in a first portion (block) of the nonvolatile memory in step 510. The new boot code can be written to a second portion (block) of the nonvolatile memory in step 520. The block selector is toggled to swap physical address references between the first portion and a second portion (block) of the nonvolatile memory in step 530. The block selector can be locked in step 540 to prevent undesired toggling of the block selector. Locking also prevent inadvertent updating of the currently selected boot block. The processor can then be re-booted in step 550 using the boot code stored in the second portion (block) of the nonvolatile memory as indicated by the block selector.

The block selector can be implemented in nonvolatile memory to ensure that the proper boot block is selected upon re-application of power to the computer system. In one embodiment, the user is free to toggle the block selector as desired. Thus the block selector can be toggled to select a different block for the next boot sequence.

In one embodiment, a locking feature is provided for the block selector to ensure that undesirable toggling of the block selector does not occur. The locking feature also serves as a verification means for power loss recovery. The locking feature may be implemented as a single bit in the nonvolatile memory such that the block selector is actually a two bit value. Alternatively, the block selector itself serves as the lock indicator. In this embodiment, the block selector indicates that the selected boot block is locked to prevent updates in accordance with the value of the block selector.

Preferably, a block other than the block used to boot the computer for the current session is chosen for updates to ensure that the user is able to properly boot in a subsequent session. Thus for example, the user should update boot code in a second block if booting from a first block in the current session. Thus if power loss occurs during updates to the boot code in the second block, the processor can use the code in the first block to boot. The locking feature merely prevents updating the block selected to boot from.

FIG. 6 illustrates a table 610 of block selector values and the actions that will be taken depending upon whether the processor is booting or an update is about to be performed.

If the block selector has a value of "1", then a first block of the nonvolatile memory will be used to retrieve the boot code during the boot sequence. The second block is available for updating, but the first block is locked to prevent updates. If the block selector has a value of "0," then the second block will be used to retrieve the boot code during the boot sequence. The second block is locked to prevent updates, but the first block is unlocked to enable updates.

The methods and apparatus described may be combined with the prior art techniques that put the user into a forced update mode as described in U.S. Pat. No. 5,579,522 of Christeson, et al. entitled "Dynamic Non-Volatile Memory Update in a Computer System."

For example, during the boot process a verification step may be performed on the block selected for booting before executing the code stored there. If the selected block's boot code is determined to be valid, then the boot sequence can continue using the code in the selected block. If the boot code is not valid, then a special limited boot sequence may be performed in order to force the user to update the boot code in the first block. Alternatively, the processor can be booted from an older version of the boot code residing in the unselected block (i.e., the block that would be selected if the block selector was toggled) after verification, if the selected block's boot code was invalid or corrupted.

The examples presented above have been presented specifically with respect to selecting one of two boot blocks. Application of the block swapping is not limited to boot blocks or single blocks. A group selector analogous to the block selector may be used to swap groups of one or more blocks rather than just one block.

Figure 8:
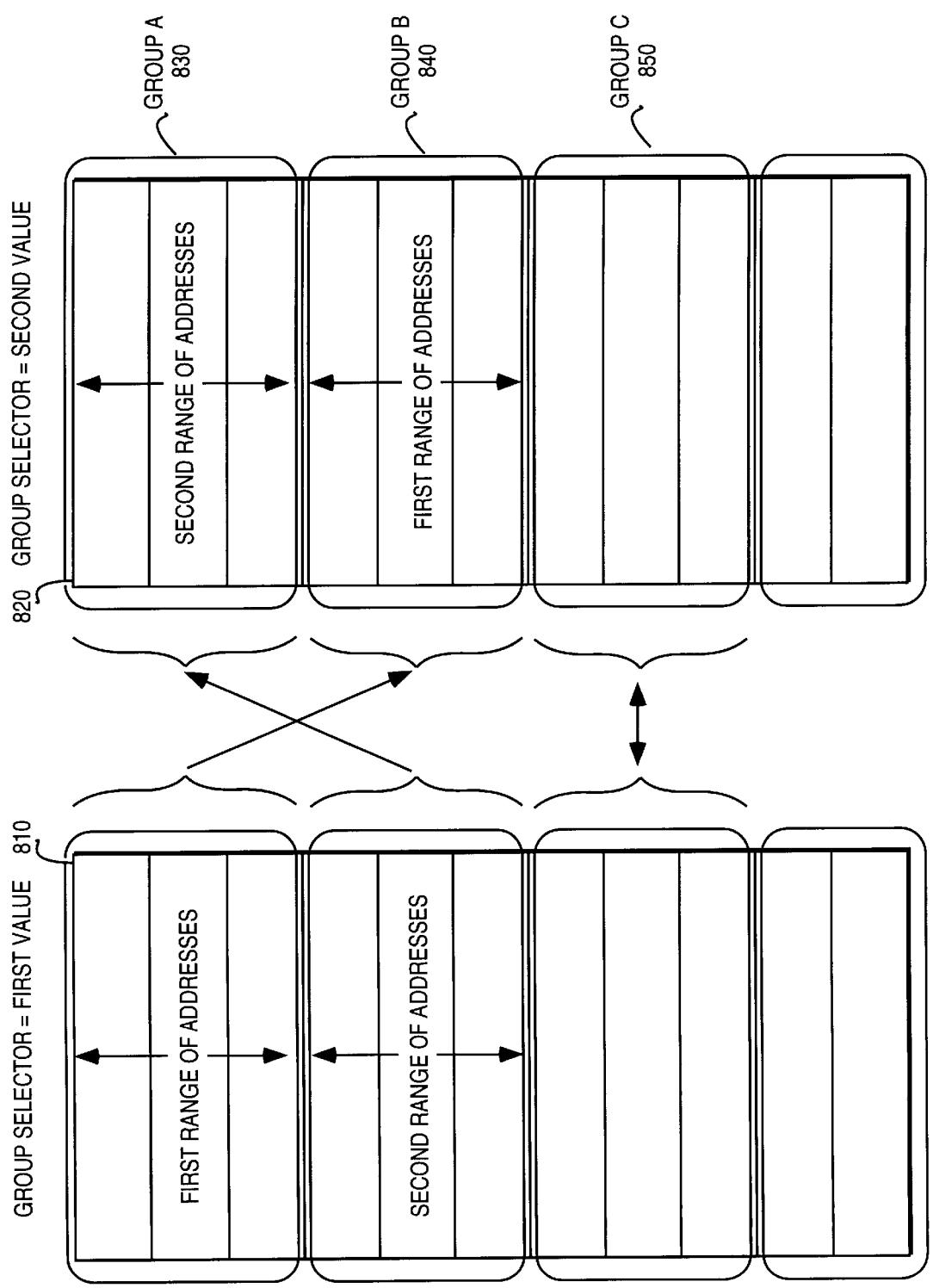
FIG. 8 illustrates the swapping of memory addresses for groups of blocks of nonvolatile memory in accordance with the value of a group selector.

FIG. 8 illustrates swapping address references for groups of blocks in accordance with a value of a group selector. A group may consist of one or more blocks. As was the case with the single blocks, the swapping of one group with another group may be applied to groups other than the group containing the boot block. Thus, for example, Groups A (830) and B (840) each contain more than one block. The operation of the decoder in accordance with the group selector is analogous to the operation of the decoder in accordance with the block selector illustrated in FIGS. 3 and 4.

Thus when the group selector has a first value, a first range of addresses will be decoded to reference Group A and a second range of addresses will be decoded to reference Group B as illustrated by the mapping of nonvolatile memory 810. When the group selector has a second value, however, the first range of addresses will be decoded to reference Group B and the second range of addresses will be decoded to reference Group A as illustrated by the mapping of nonvolatile memory 820.

The swapping of one group with another group need not be limited to swapping contiguous groups of blocks. Within a group, the blocks are contiguously addressed as illustrated by Groups A and B. The swapped groups, however, do not need to be contiguous to each other. Thus Group A need not be contiguous with Group B as illustrated in FIG. 8. The decoder could be configured, for example, to swap Group A (830) and Group C (850) rather than contiguous groups A and B. The swapped groups, however, should be configured to have the same corresponding number and sized blocks.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method for providing data to a memory, the method comprising:

writing data to a selected portion of a nonvolatile memory, the nonvolatile memory having a first portion associated with a first range of addresses and a second portion associated with a second range of addresses, and wherein the selected portion is the second portion; and toggling values of a block selector to swap addresses of the first and second portions if the block selector is unlocked, wherein the first range of addresses reference the second portion of nonvolatile memory and the second range of addresses reference the first portion of nonvolatile memory.

2. The method of claim 1, further comprising:

booting a processor using boot data stored at a pre-determined location within the nonvolatile memory, wherein the pre-determined location references the first portion in accordance with the block selector.

3. The method of claim 2, further comprising:

rebooting the processor, wherein the pre-determined location references the second portion in accordance with the block selector.

4. The method of claim 1, wherein the nonvolatile memory is a flash electrically erasable programmable read only memory.

5. The method of claim 1, wherein each of the first and second portions comprises a block of the nonvolatile memory.

6. The method of claim 1, further comprising:

locking the block selector.

7. An apparatus for accessing a memory comprising:

a processor to initiate a boot sequence at a pre-determined address;

a block selector having a lock status or an unlock status;

a nonvolatile memory having a first and second block; and an address decoder to access the first block in response to the pre-determined address if the block selector has a first value and is in an unlock status, and wherein the address decoder is to access the second block in response to the pre-determined address if the block selector has a second value and is in an unlock status.

8. The apparatus of claim 7, wherein at least one of the first and second blocks stores boot data.

9. The apparatus of claim 7, wherein at least one of the first and second blocks is locked to prevent modification.

10. The apparatus of claim 7, wherein the block selector is lockable to prevent subsequent modification of a block selector value.

11. A method for accessing a memory, the method comprising:

receiving an address from a processor;

decoding the address in accordance with a first value of a group selector to access a first group of at least one block of nonvolatile memory associated with a first range of addresses if the group selector is unlocked, and wherein a second group of at least one block of nonvolatile memory is associated with a second range of addresses; and toggling the group selector to a second value and if the group selector is unlocked, wherein the first range is associated with the second group and the second range is associated with the first group.

12. The method of claim 11, wherein one of the first and second groups includes a block storing boot data.

13. The method of claim 11, wherein the first and second groups each comprises a single block.

14. The method of claim 11, wherein the first and second groups each comprises a plurality of blocks.

15. The method of claim 11, wherein the first and second groups are contiguous groups of nonvolatile memory.

16. The method of claim 11, wherein the first and second groups are non-contiguous groups of nonvolatile memory.

17. An apparatus for accessing a memory comprising:
a nonvolatile memory having a plurality of blocks;
a group selector having a locked status and an unlocked status; and
an address decoder coupled to the group selector and the nonvolatile memory, wherein the address decoder is to associate a first range of addresses with a first group of at least one block of nonvolatile memory and a second range of addresses with a second group of at least one block of nonvolatile memory if the group selector has a first value and is in the unlocked status, and wherein the address decoder is to associate the first range with the second group and the second range with the first group if the group selector has a second value and is in the unlocked status.

18. The apparatus of claim 17, wherein at least one of the first and second groups includes a block storing boot data.

19. The apparatus of claim 17, wherein each of the first and second groups comprises a single block.

20. The apparatus of claim 17, wherein each of the first and second groups comprises a plurality of blocks.

21. The apparatus of claim 17, wherein the first and second groups are contiguous groups of nonvolatile memory.

22. The apparatus of claim 17, wherein the first and second groups are non-contiguous groups of nonvolatile memory.

23. The apparatus of claim 17, wherein at least one of the first and second groups of the nonvolatile memory is lockable to prevent modifications.

* * * * *